(12) United States Patent
Wu

(10) Patent No.: US 11,243,823 B2
(45) Date of Patent: Feb. 8, 2022

(54) SYSTEM AND METHOD CAPABLE OF REMOTELY CONTROLLING ELECTRONIC APPARATUS TO EXECUTE PROGRAM

(71) Applicant: INNODISK CORPORATION, New Taipei (TW)

(72) Inventor: Chih-Ching Wu, New Taipei (TW)

(73) Assignee: Innodisk Corporation, New Taipei (TW)

( * ) Notice: Subject to any disclaimer, the term of this patent is extended or adjusted under 35 U.S.C. 154(b) by 115 days.

(21) Appl. No.: 16/655,751

(22) Filed: Oct. 17, 2019

(65) Prior Publication Data
US 2021/0034441 A1 Feb. 4, 2021

(30) Foreign Application Priority Data
Jul. 29, 2019 (TW) .................................. 108126860

(51) Int. Cl.
| G06F 9/54 | (2006.01) |
| G06F 8/658 | (2018.01) |
| G06F 9/451 | (2018.01) |
| G06F 11/30 | (2006.01) |
| G06F 12/14 | (2006.01) |
| G06F 13/16 | (2006.01) |

(Continued)

(52) U.S. Cl.
CPC .............. G06F 9/542 (2013.01); G06F 8/658 (2018.02); G06F 9/452 (2018.02); G06F 11/3006 (2013.01); G06F 12/1408 (2013.01); G06F 13/1668 (2013.01); G06F 21/602 (2013.01); G06F 21/78 (2013.01)

(58) Field of Classification Search
CPC ....................................................... G06F 9/542
USPC ........................................................ 719/318
See application file for complete search history.

(56) References Cited

U.S. PATENT DOCUMENTS 9,721,660 B2 * 8/2017 Kelly .................. G06F 13/4282
9,762,548 B2 * 9/2017 Cocotis ............... H04L 63/0428
(Continued)

FOREIGN PATENT DOCUMENTS

| CN | 203386478 U | 1/2014 |
| GN | 106970866 A | 7/2017 |
| TW | 201005534 A1 | 2/2010 |

*Primary Examiner* — Andy Ho
(74) *Attorney, Agent, or Firm* — Rosenberg, Klein & Lee

(57) ABSTRACT

The invention provides a system capable of remotely controlling electronic apparatus to execute program. The system comprises a cloud management platform and at least one electronic apparatus. The electronic apparatus comprises a data storage device and a program execution management device. The data storage device comprises a plurality of flash memories and a controller. The program execution management device comprises a microprocessor having a network communication function. When the cloud management platform wants the electronic device to execute a specific operation or collect a specific information, it will send a specific operation instruction to the program execution management device. The microprocessor of the program execution management device wants that the controller of the data storage device executes a corresponding operation program according to the specific operation instruction to generate an execution message related to the specific operation, and then transmits the execution message to the cloud management platform.

20 Claims, 9 Drawing Sheets

(51) Int. Cl.
  *G06F 21/60*   (2013.01)
  *G06F 21/78*   (2013.01)

(56) References Cited

U.S. PATENT DOCUMENTS

| | | | |
|---|---|---|---|
| 10,476,751 B2* | 11/2019 | Dotchkoff | H04L 67/12 |
| 10,587,590 B2* | 3/2020 | Trantham | G06F 21/6218 |
| 2008/0250509 A1 | 10/2008 | Ahvenainen | |
| 2013/0124932 A1 | 5/2013 | Schuh | |
| 2015/0293858 A1 | 10/2015 | Raam | |
| 2019/0266361 A1* | 8/2019 | Halladay | H05B 6/362 |
| 2020/0106607 A1* | 4/2020 | Lo | H04L 63/10 |

* cited by examiner

SYSTEM AND METHOD CAPABLE OF REMOTELY CONTROLLING ELECTRONIC APPARATUS TO EXECUTE PROGRAM

This non-provisional application claims priority claim under 35 U.S.C. § 119(a) on Taiwan Patent Application No. 108126860 filed Jul. 29, 2019, the entire contents of which are incorporated herein by reference.

FIELD OF THE INVENTION

The present invention relates to a system and method for controlling the electronic apparatus to execute program, more particularly, a system and method for remotely controlling the electronic apparatus to execute program.

BACKGROUND

With the needs of life, unattended electronic devices such as vending machines, advertising machines, monitors, etc. are often seen on the road.

In the past, when the operating system of the electronic apparatus was crashed or damaged, the engineer had to go to the installation location of the electronic apparatus in person to repair the operating system of the electronic device, for example, restarting or restoring the operating system of the electronic apparatus. If the installation location of the electronic apparatus is very remote or the operating systems of a large number of electronic apparatuses are crashed or damaged, it will cause a serious burden on the repairing work of operating system.

Nowadays, the electronic apparatus is often equipped with a network communication module. The remote manager can directly update the internal data of the electronic apparatus or execute one or more specific operations for the electronic apparatus via the network communication module. The cloud management platform is usually to control or manage the electronic apparatus in a way of In-Band, which must be performed in an operating environment of an operating system, and adopted a general data transmission channel (such as transmission channel of SATA or PCIe) to transmit the instructions to be used for controlling the electronic apparatus. The cloud management platform controls or manages the electronic apparatus by the way of In-Band, once the operating system of the electronic apparatus crashes or fails, the manager of the cloud management platform cannot perform any operations for the electronic apparatus, and can only wait for the engineering to go to the installation location of the electronic apparatus, and repair the operating system of the electronic apparatus.

SUMMARY

It is one objective of the present invention to provide a system and method capable of remotely controlling electronic apparatus to execute program, in which the system comprises a cloud management platform and at least one electronic apparatus, the electronic apparatus comprises a data storage device and a program execution management device, the data storage device comprises a plurality of flash memories and a controller, the program execution management device comprises a microprocessor that is having a network communication function and equipped with an embedded system, the microprocessor of the program execution management device is connected to the controller of the data storage device via a dedicated connection line. The manager of the cloud management platform can manage the programs executed by the controller of the data storage device via the program execution management device, the microprocessor of the program execution management device can directly communicate with the controller of the data storage device via the dedicated connection line without the assistance of the operating system and the data transmission channel during the program execution management device managing the programs executed by the controller. Accordingly, when the operating system of the data storage device fails or the data storage device does not has the operating system, the manager of the cloud management platform at the remote end, via the program execution management device, can still control that the controller of the data storage device executes the operation of the specific program.

To achieve the above objective, the present invention provides a system capable of remotely controlling electronic apparatus to execute program, comprising: a cloud management platform, comprising a management interface; and at least one electronic apparatus, each of the electronic apparatuses comprising: a data storage device comprising a plurality of flash memories and a controller connected to the flash memories, the controller comprising a firmware, wherein, a plurality of operation programs are defined in the firmware; and a program execution management device comprising a microprocessor and a network communication component connected to the microprocessor, wherein the program execution management device is communicated with the cloud management platform via the network communication component, and the microprocessor of the program execution management device is connected to the controller of the data storage device via a connection line; wherein the cloud management platform sends a specific operation instruction to the program execution management device when the cloud management platform wants that the electronic apparatus executes a specific operation, the microprocessor of the program execution management device transmits the specific operation instruction to the controller of the data storage device; afterwards, the controller executes the corresponding operation program according to a requirement of the specific operation instruction to generate an execution message related to the specific operation, and transmits the execution message related to the specific operation to the cloud management platform.

In one embodiment of the present invention, wherein the microprocessor of the program execution management device is equipped with an embedded system, which is used to manage the operation programs executed by the controller.

In one embodiment of the present invention, wherein the specific operation instruction sent from the cloud management platform is an instruction for collecting health information of the data storage device, the controller executes a program for collecting health information of the data storage device according to the instruction for collecting health information of the data storage device, and generate a file containing the health information of the data storage device; afterwards, the program execution management device receives the file containing the health information of the data storage device from the controller via the connection line, and transmits the file containing the health information of the data storage device to the cloud management platform via the network communication component.

In one embodiment of the present invention, wherein the specific operation instruction sent from the cloud management platform is a data encryption instruction, the data encryption instruction includes an encryption key, the controller executes a data encryption program according to the data encryption instruction to encrypt data in the flash memories by the encryption key in the data encryption instruction, and generates a message indicating the completion of encryption of data after the data encryption program has executed; afterwards, the program execution management device receives the message indicating the completion of encryption of data from the controller via the connection line, and transmits the message indicating the completion of encryption of data to the cloud management platform via the network communication component.

In one embodiment of the present invention, wherein the data storage device further comprises an encryption chip connected to the controller and the flash memories, the specific operation instruction sent from the cloud management platform is a data encryption instruction, the controller executes a data encryption program according to the data encryption instruction to encrypt data in the flash memories by the encryption chip, and generates a message indicating the completion of encryption of data after the data encryption program has executed; afterwards, the program execution management device receives the message indicating the completion of encryption of data from the controller via the connection line, and transmits the message indicating the completion of encryption of data to the cloud management platform via the network communication component.

In one embodiment of the present invention, where the specific operation instruction sent from the cloud management platform is a data erasion instruction, the controller executes a data erasion program according to the data erasion instruction to erase data in blocks of the flash memories, and generates a message indicating the completion of erasion of data after the data erasion program has executed; afterwards, the program execution management device receives the message indicating the completion of erasion of data from the controller via the connection line, and transmits the message indicating the completion of erasion of data to the cloud management platform via the network communication component.

In one embodiment of the present invention, wherein the specific operation instruction sent from the cloud management platform is a physical destruction instruction, the controller executes a physical destruction program according to the physical destruction instruction to destroy the flash memories by a high voltage that is outputted from a high voltage circuit enabled by the controller, and generates a message indicating the completion of physical destruction after the physical destruction program has executed; afterwards, the program execution management device receives the message indicating the completion of physical destruction from the controller via the connection line, and transmits the message indicating the completion of physical destruction to the cloud management platform via the network communication component.

In one embodiment of the present invention, wherein the flash memories of the data storage device is formed with a data sector, at least one partition is cut out from the data sector by the controller, the specific operation instruction sent from the cloud management platform is a write protection setting instruction, the controller executes a write protection setting program according to the write protection setting instruction to set the partition of the flash memories to be a read-only area for prohibiting to be written, and generates a message indicating the completion of setting write protection after the write protection setting program has executed; afterwards, the program execution management device receives the message indicating the completion of setting write protection from the controller via the connection line, and transmits the message indicating the completion of setting write protection to the cloud management platform via the network communication component.

In one embodiment of the present invention, wherein the specific operation instruction sent from the cloud management platform is an updating firmware instruction, the updating firmware instruction includes a firmware updating file, the controller executes an updating firmware program according to the updating firmware instruction to update the firmware of the controller by the firmware updating file, and generates a message indicating the completion of updating firmware after the updating firmware program has executed; afterwards, the program execution management device receives the message indicating the completion of updating firmware from the controller via the connection line, and transmits the message indicating the completion of updating firmware to the cloud management platform via the network communication component.

In one embodiment of the present invention, wherein the microprocessor of the program execution management device is a chip with network communication function, the network communication component is integrated in the microprocessor.

In one embodiment of the present invention, the electronic apparatus further comprises a circuit board, the flash memories and the controller of the data storage device and the microprocessor and the network communication component of the program execution management device are disposed on the circuit board.

In one embodiment of the present invention, the electronic apparatus comprises a first circuit board and a second circuit board, the flash memories and the controller of the data storage device are disposed on the first circuit board, and the microprocessor and the network communication component of the program execution management device are disposed on the second circuit board.

In one embodiment of the present invention, wherein the microprocessor of the program execution management device is connected to the controller of the data storage device via the connection line conforming to RS232 specification, UART specification, or I2C specification.

In one embodiment of the present invention, wherein the data storage device is a data storage device having a SATA transmission interface, a PCIe transmission interface or an M.2 transmission interface.

In one embodiment of the present invention, wherein the network communication component is a WiFi communication component, an Ethernet communication component, or a 3G, 4G or 5G communication component.

The present invention further provides a method capable of remotely controlling electronic apparatus to execute program, which is applied to a system capable of remotely controlling electronic apparatus to execute program, the system comprises a cloud management platform and at least one electronic apparatus, the electronic apparatus comprises a data storage device and a program execution management device, the data storage device comprises a plurality of flash memories and a controller, the controller comprises a firmware, a plurality of operation programs are defines in the firmware, the program execution management device comprises a microprocessor that is having a network communication function and equipped with an embedded system, the microprocessor of the program execution management device is connected to the controller of the data storage device via a connection line, steps of the method capable of remotely controlling electronic apparatus to execute program comprising: requiring the program execution management device to communicate with the cloud management platform; requiring the program execution management device to receive a specific operation instruction sent from the cloud management platform; requiring the program execution management device to transmit the specific operation instruction to the controller of the data storage device; requiring the controller of the data storage device to execute a specific operation of the corresponding operation program according to the specific operation instruction and generate an execution message related to the specific operation; and requiring the program execution management device to receive the execution message related to the specific operation from the controller of the data storage device via the connection line and transmit the execution message related to the specific operation to the cloud management platform.

DETAILED DESCRIPTION OF THE PREFERRED EMBODIMENTS

Figure 1:
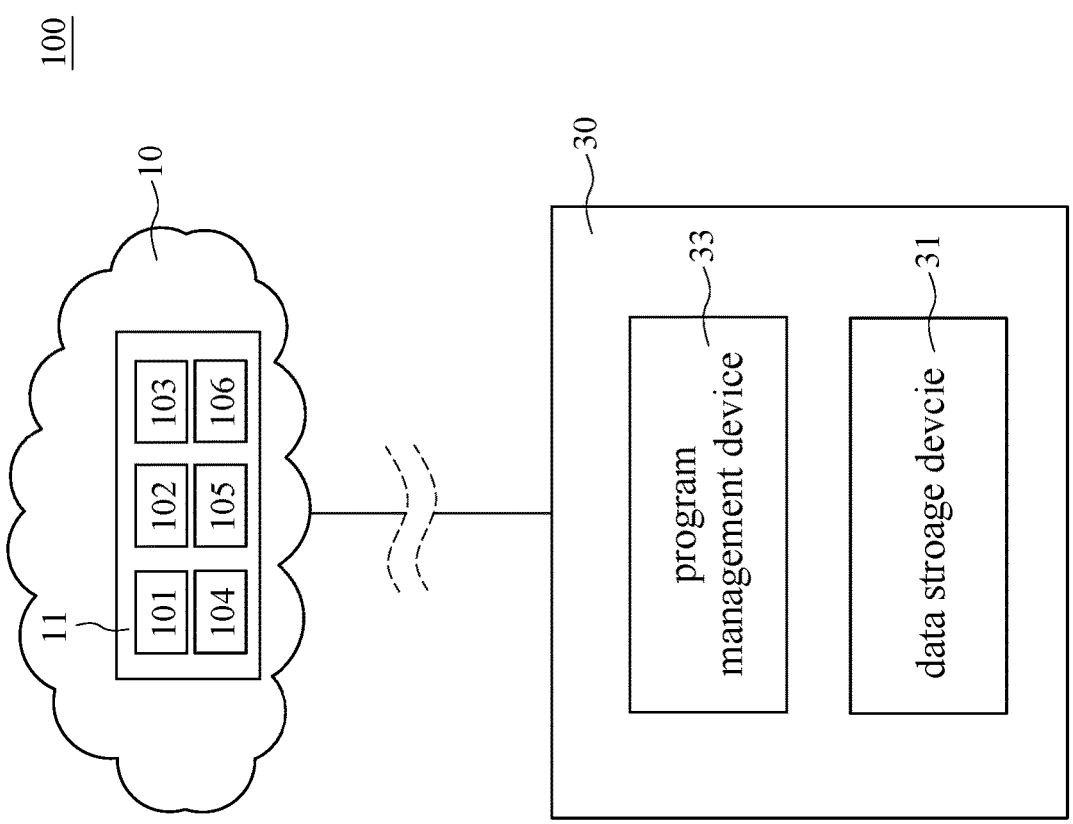
FIG. 1 is an architecture diagram of a system capable of remotely controlling the electronic apparatus to execute program according to the present invention.
Figure 2:
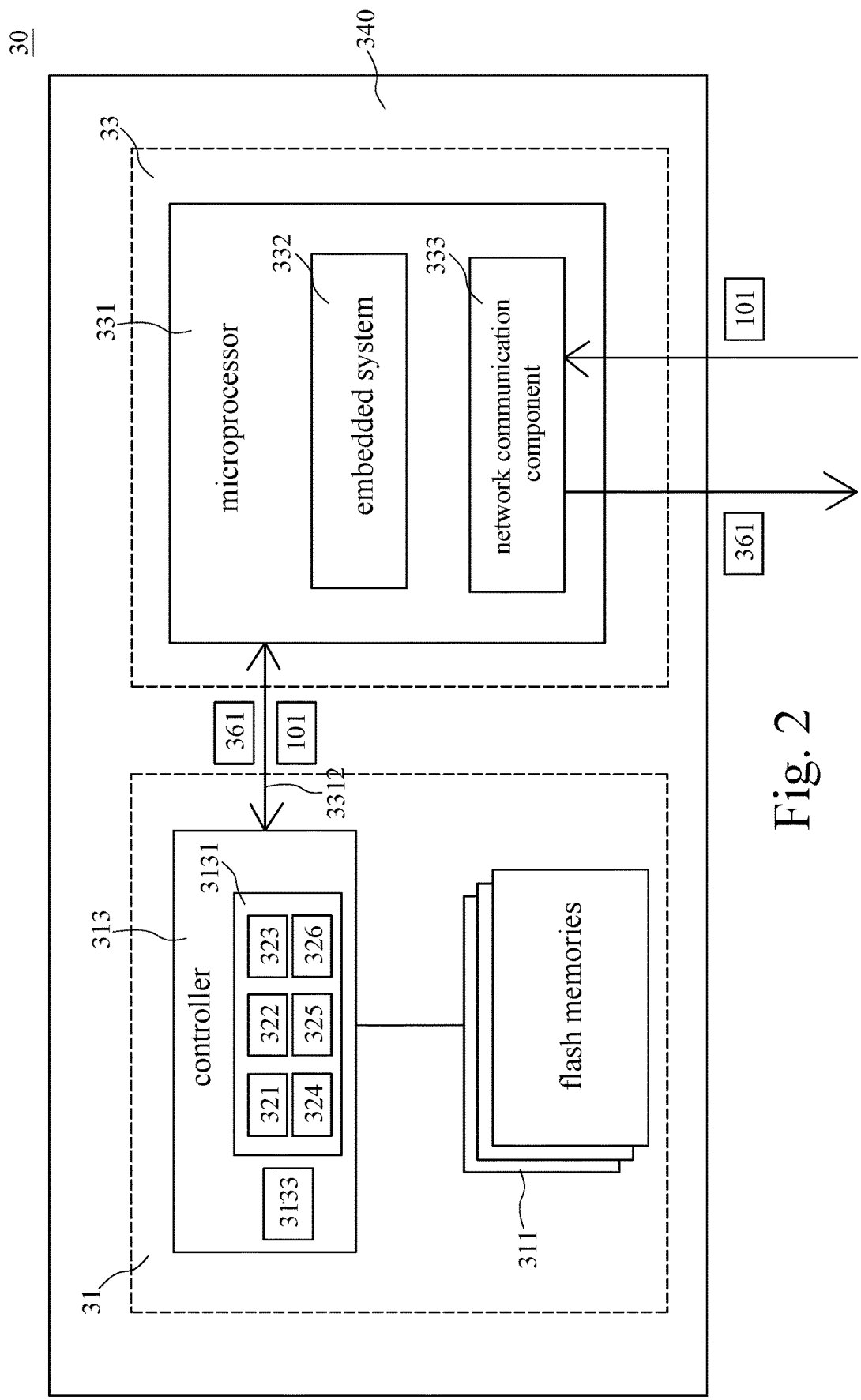
FIG. 2 is a circuit diagram of the electronic apparatus according to one application embodiment of the present invention.

Referring to FIG. 1 and FIG. 2, there are shown an architecture diagram of a system capable of remotely controlling the electronic apparatus to execute program according to the present invention, and a circuit diagram of the electronic apparatus according to one application embodiment of the present invention, respectively. As shown in FIG. 1 and FIG. 2, the system 100 comprises a cloud management platform 10 and at least one electronic apparatus 30. The electronic apparatus 30 is a vending machine, an advertising machine, a monitor, a POS (Point of Sale) machine, a monitor, or other equipment with specific purpose. A manager of the cloud management platform 10 can remotely control the electronic apparatus 30 to execute a specific program.

The electronic apparatus 30 comprises a data storage device 31 and a program execution management device 33. The data storage device 31 may be a solid state disk (SSD) having a SATA transmission interface, a PCIe transmission interface or an M.2 transmission interface. The data storage device 31 comprises a plurality of flash memories 311 and a controller 313. The controller 313 is connected to the flash memories 311. The controller 313 comprises a firmware 3131. A plurality of operation programs 321, 322, 323, 324, 325, 326 are defined in the firmware 3131. Besides, the flash memories 311 of the data storage device 31 may be installed with an operating system, or without an operating system.

The program execution management device 33 comprises a microprocessor 331. In one embodiment of the present invention, the microprocessor 331 is a chip with network communication function, for example, a network communication component 333 is integrated in the microprocessor 331. In another embodiment of the present invention, the microprocessor 331 and the network communication component 333 are independent components, respectively, and the microprocessor 331 is connected to the network communication component 333. Besides, the microprocessor 331 is equipped with an embedded system 332, which is an architecture system of Linux or RTOS (such as TinyOS) and is stored in non-volatile memories (NVMs). The microprocessor 331 of the program execution management device 33, by the embedded system 332, manages that the controller 313 executes the operation program 321, 322, 323, 324, 325, or 326. The program execution management device 33 is communicated with the cloud management platform 10 via the network communication component 333. The network communication component 333 is a WiFi communication component, an Ethernet communication component, a 3G, 4G or 5G communication component, or other networkable communication component. The microprocessor 331 of the program execution management device 33 is connected to the controller 313 of the data storage device 31 via a dedicated connection line 3312. The microprocessor 331 and the controller 313 can transmit data to each other via the connection line 3312. The connection line 3312 may be a connection line conforming to RS232 specification, UART specification, or I2C specification.

Figure 3:
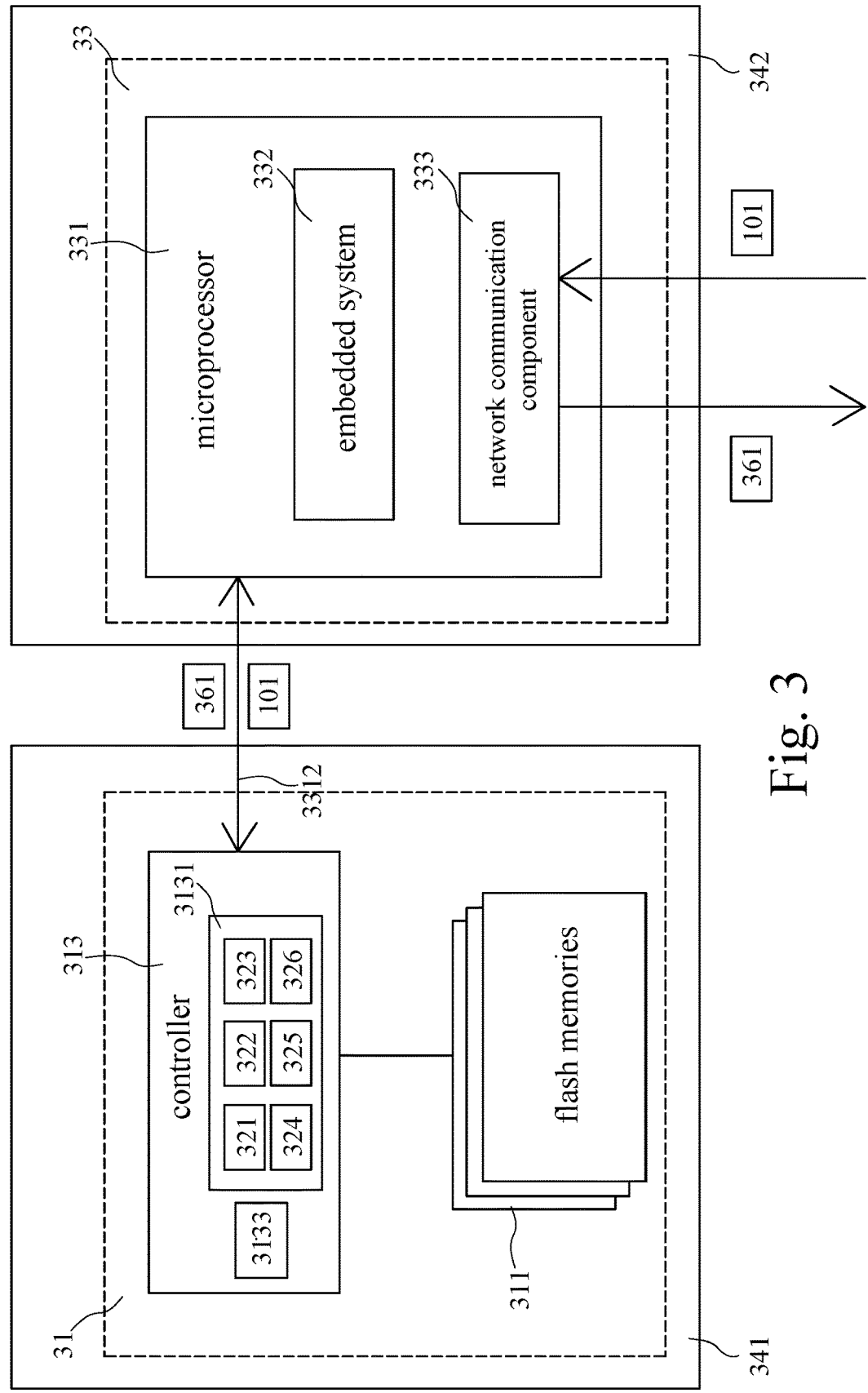
FIG. 3 is a circuit diagram of the electronic apparatus according to another application embodiment of the present invention.

One embodiment of the present invention, as shown in FIG. 2, the data storage device 31 and the program execution management device 33 can be integrated into a single device, and the electronic components of the data storage device 31 and the program execution management device 33 are all disposed on the same circuit board. For example, the flash memories 311, the controller 313, the microprocessor 331, the network communication component 333 are all disposed on a circuit board 340. Another embodiment of the present invention, as shown in FIG. 3, the data storage device 31 and the program execution management device 33 are separate devices, and the electronic components of the data storage device 31 and the program execution management device 33 are respectively disposed on different circuit boards. For example, the flash memories 311 and the controller 313 of the data storage device 31 are disposed on a first circuit board 341, and the microprocessor 331 and the network communication component 333 of the program execution management device 33 are disposed on a second circuit board 342.

When the manager of the cloud management platform 10 wants that the electronic apparatus 30 executes a specific operation, it will sends a specific operation instruction 101, 102, 103, 104, 105, or 106 to the electronic apparatus 30 by a management interface 11. The management interface 11 may be an application programming interface in WEB form (WEB App). After the program execution management device 33 receives the specific operation instruction 101, 102, 103, 104, 105, or 106 sent from the cloud management platform 10 via the network communication component 333, the microprocessor 331 of the program execution management device 33 transmits the specific operation instruction 101, 102, 103, 104, 105, or 106 to the controller 313 via the connection line 3312 so as to require that the controller 313 of the data storage device 31 executes a corresponding operation program 321, 322, 323, 324, 325, or 326 according to the specific operation instruction 101, 102, 103, 104, 105, or 106, and therefore generates at least one execution message related to the specific operation. Then, the microprocessor 331 of the program execution management device 33 receives the execution message related to the specific operation from the controller 313 via the connection line 3312, and transmits the execution message related to the specific operation to the cloud management platform 10 via the network communication component 333. The cloud management platform 10 after receiving the execution message related to the specific operation, the manager of the cloud management platform 10 can know that the specific operation has been executed by the controller 313 of the data storage device 31.

As shown in FIG. 1 and FIG. 2, in one application embodiment of the present invention, for monitoring a service life of the data storage device 31, the manager of the cloud management platform 10 can control that the electronic apparatus 30 executes an operation for collecting health information of the data storage device 31, and therefore send an instruction 101 for collecting health information of the data storage device 31 to the electronic apparatus 30. After the program execution management device 33 of the electronic apparatus 30 receives the instruction 101 sent from the cloud management platform 10 via the network communication component 333, the microprocessor 331 of the program execution management device 33 transmits the instruction 101 to the controller 313 via the connection line 3312, and then the controller 313 of the data storage device 31 executes a program 321 for collecting health information of the data storage device 31 according to the requirement of the instruction 101. The controller 313 will generate a file 361 containing the health information of the data storage device 31 after the health information of the data storage device 31 has collected. The program execution management device 33 receives the file 361 from the controller 313 via the connection line 3312, and transmits the file 361 to the cloud management platform 10 via the network communication component 333. The health information in the file 361 will display on the management interface 11 of the cloud management platform 10 when the cloud management platform 10 receives the file 361. Accordingly, the manager of the cloud management platform 10 can know the health status of the current data storage device 31 by analyzing the health information of the data storage device 31 in the file 361, and therefore determine whether to replace the data storage device 31 of the electronic apparatus 30.

During the controller 313 reading and writing the flash memory 311 of the data storage device 31, the controller 313 has record some parameters related to the health information of the data storage device 31, such as Raw Bit Error Rate (RBER), Program/Erase cycle (P/E cycle), average erase count, later bad block count, program fail count, unexpected power loss, etc., and these parameters of health information are recorded in a memory unit 3133, for example, non-volatile memory (NVM). Afterwards, when the controller 313 executes the program 321 for collecting the health information of the data storage device 31, it will capture these parameters of health information from the memory unit 3133, and therefore generate the file 361 containing the health information of the data storage device 31.

Figure 4:
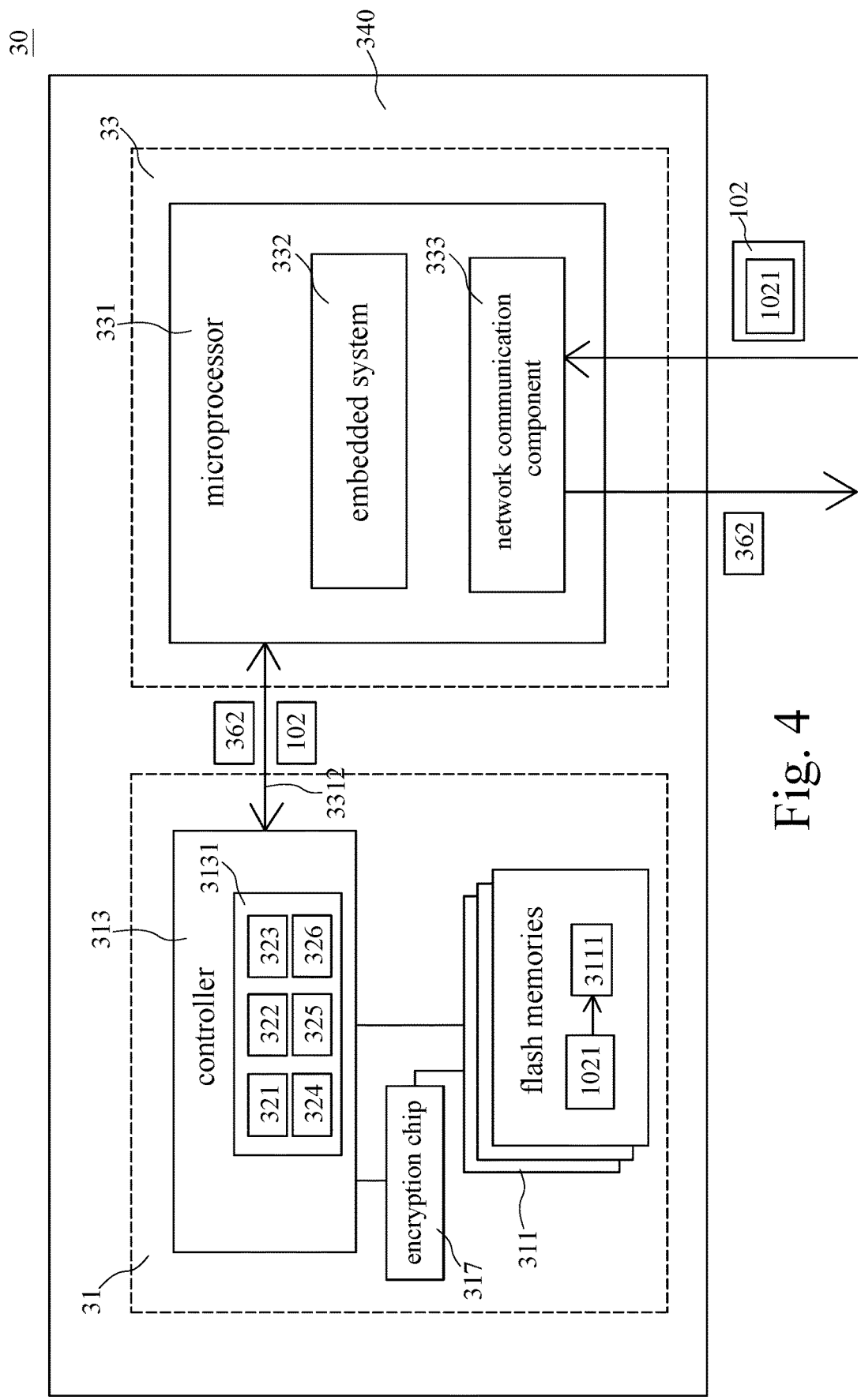
FIG. 4 is a circuit diagram of the electronic apparatus according to another application embodiment of the present invention.

Referring to FIG. 4, there is a circuit diagram of the electronic apparatus according to another application embodiment of the present invention, and referring to FIG. 1, simultaneously. In this present application embodiment, the manager of the cloud management platform 10 can control that the electronic apparatus 30 executes an operation of encrypting data, as shown in FIG. 1 and FIG. 4. When the manager of the cloud management platform 10 wants that the electronic apparatus 30 executes the operation of encrypting data, he sends a data encryption instruction 102 to the electronic apparatus 30 via the management interface 11. The data encryption instruction 102 includes an encryption key 1021. After the electronic apparatus 30 receives the data encryption instruction 102 sent from the cloud management platform 10 via the network communication component 333, the microprocessor 331 of the program execution management device 33 will transmit the data encryption instruction 102 to the controller 313 via the connection line 3312, and then the controller 313 of the data storage device 31 will execute a data encryption program 322 according to the requirement of the data encryption instruction 102. During the execution of the data encryption program 322, the controller 313 encrypts data 3111 stored in the flash memories 311 by the encryption key 1021 in the data encryption instruction 102. The controller 313 will generate a message 362 indicating the completion of encryption of data after the data encryption program 322 has executed. The program execution management device 33 receives the message 362 from the controller 313 via the connection line 3312, and transmits the message 362 to the cloud management platform 10 via the network communication component 333. The manager of the cloud management platform 10 can know that the data 3111 in the data storage device 31 has been encrypted after the cloud management platform 10 receives the message 362 indicating the completion of encryption of data. Accordingly, the manager of the cloud management platform 10 at the remote end can encrypt the data 3111 stored in the electronic apparatus 30 to prevent others from easily accessing data 3111 in the electronic apparatus 30.

In the above embodiment of the present invention, the encryption protection of the data 3111 of the data storage device 31 is performed by using the encryption key 1021 in a way of software. In another embodiment of the present invention, the encryption protection of the data 3111 of the data storage device 31 is performed by using an encryption chip in a way of hardware. As shown in FIG. 4, the data storage device 31 further comprises an encryption chip 317. The encryption chip 317 is connected to the controller 313 and the flash memories 311. When the controller 313 receives the data encryption instruction 102, it will execute the data encryption program 322 to encrypt data 3111 of the flash memories 311 by the encryption chip 317. The controller 313 generate a message 362 indicating the completion of encryption of data after the data 3111 of the flash memories 311 has encrypted by the encrypted chip 317. The program execution management device 33 receives the message 362 from the controller 313 via the connection line 3312, and transmits the message 362 to the cloud management platform 10 via the network communication component 333. In the present invention, the controller 313 and the encryption chip 317 are independent chips, or the controller 313 and the encryption chip 317 may be integrated into a single chip.

Figure 5:
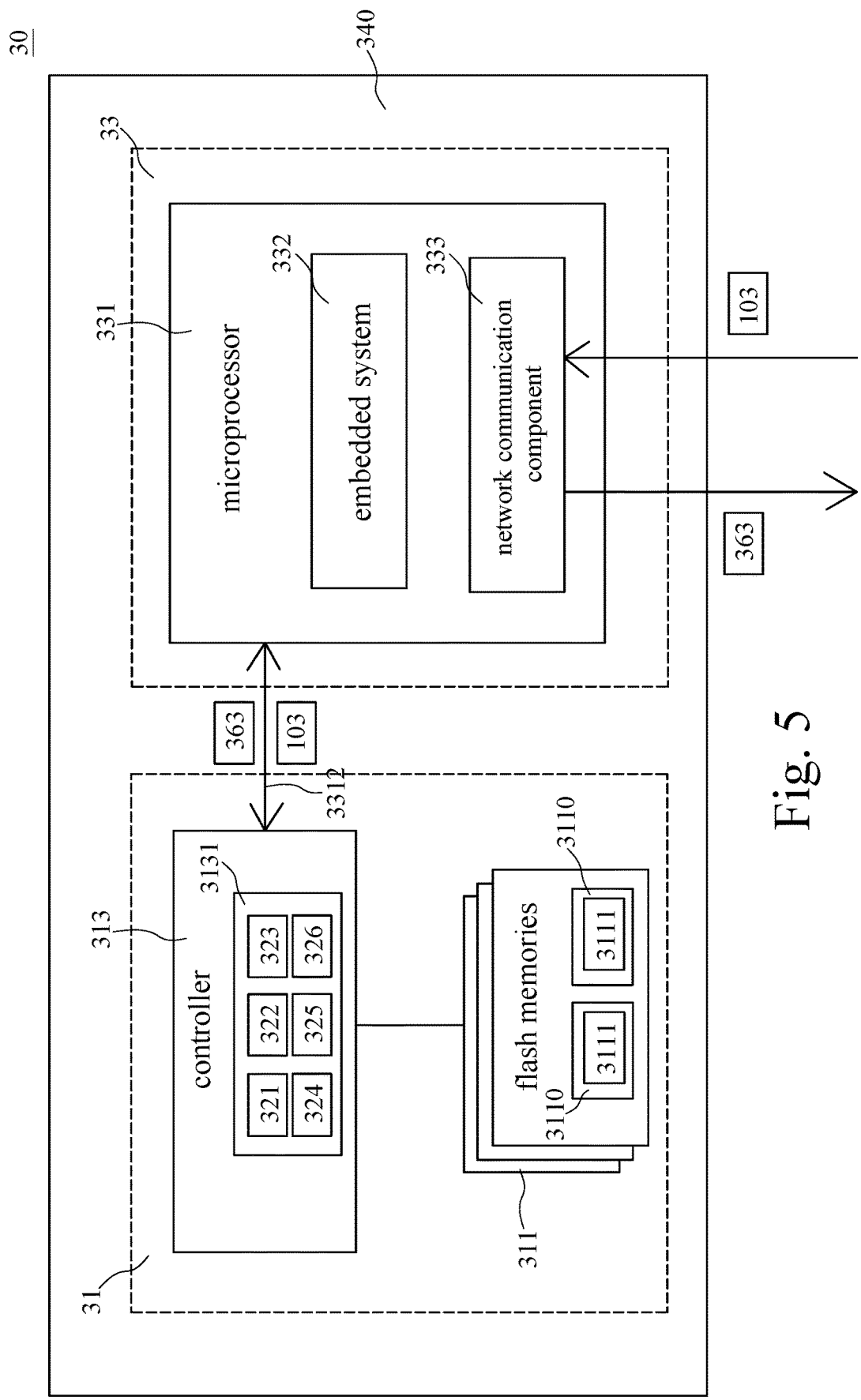
FIG. 5 is a circuit diagram of the electronic apparatus according to another application embodiment of the present invention.

Referring to FIG. 5, there is a circuit diagram of the electronic apparatus according to another application embodiment of the present invention, and referring to FIG. 1, simultaneously. In this present embodiment, the manager of the cloud management platform 10 can control that the electronic apparatus 30 executes an operation of erasing data, as shown in FIG. 1 and FIG. 5. When the manager of the cloud management platform 10 wants that the electronic apparatus 30 executes the operation of erasing data, he sends a data erasion instruction 103 to the electronic apparatus 30 via the management interface 11. After the electronic apparatus 30 receives the data erasion instruction 103 sent from the cloud management platform 10 via the network communication component 333, the microprocessor 331 of the program execution management device 33 will transmit the data erasion instruction 103 to the controller 313 via the connection line 3312, and then the controller 313 of the data storage device 31 will execute a data erasion program 323 according to the requirement of the data erasion instruction 103. During the execution of the data erasion program 323, the controller 313 erases data 3111 in partial block 3110 of the flash memories 311 or data 3111 in all block 3110 of the flash memories 311. The controller 313 will generate a message 363 indicating the completion of erasion of data after the data erasion program 323 has executed. The program execution management device 33 receives the message 363 from the controller 313 via the connection line 3312, and transmits the message 363 to the cloud management platform 10 via the network communication component 333. The manager of the cloud management platform 10 can know that the data 3111 in the electronic apparatus 30 has been erased after the cloud management platform 10 receives the message 363 indicating the completion of erasion of data. Accordingly, the manager of the cloud management platform 10 can remotely erase the data 3111 stored in the data storage device 31 of the electronic apparatus 30 before the electronic apparatus 30 is ready to be scrapped to prevent the risk of leakage of confidential data.

Figure 6:
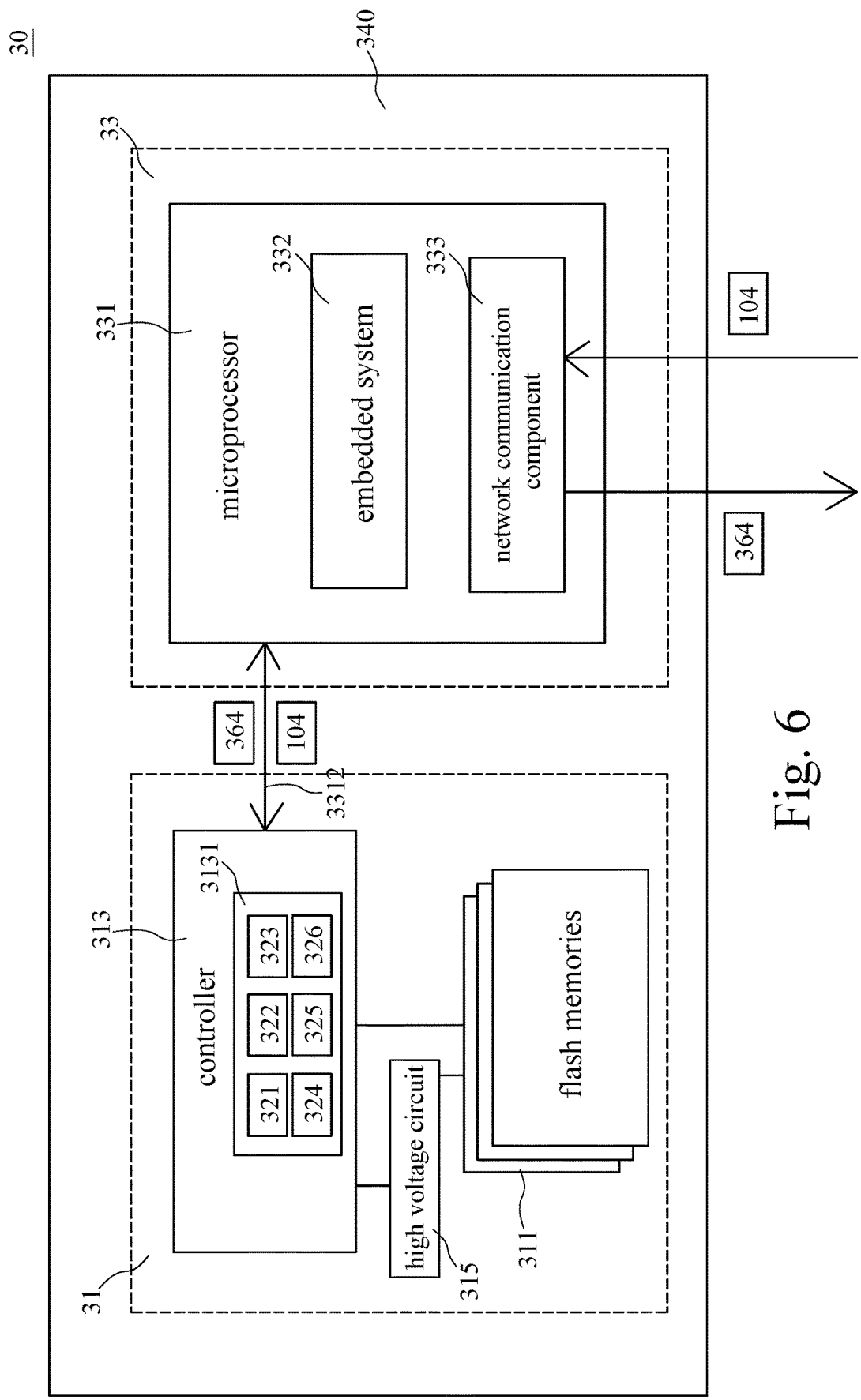
FIG. 6 is a circuit diagram of the electronic apparatus according to another application embodiment of the present invention.

Referring to FIG. 6, there is a circuit diagram of the electronic apparatus according to another application embodiment of the present invention, and referring to FIG. 1, simultaneously. In this present embodiment, the manager of the cloud management platform 10 can control that the electronic apparatus 30 executes an operation of physical destruction, as shown in FIG. 1 and FIG. 6. When the manager of the cloud management platform 10 wants that the electronic apparatus 30 executes the operation of physical destruction, he sends a physical destruction instruction 104 to the electronic apparatus 30 via the management interface 11. After the electronic apparatus 30 receives the physical destruction instruction 104 sent from the cloud management platform 10 via the network communication component 333, the microprocessor 331 of the program execution management device 33 will transmit the physical destruction instruction 104 to the controller 313 via the connection line 3312, and then the controller 313 of the data storage device 31 will execute a physical destruction program 324 according to the requirement of the operation instruction 104. During the execution of the physical destruction program 324, a high voltage circuit 315 between the flash memories 311 and the controller 313 will be enabled by the controller 313 to output a high voltage to the flash memories 311, such that memory cells of the flash memories 311 will be destroyed by the high voltage. The controller 313 will generate a message 364 indicating the completion of physical destruction after the physical destruction program 324 has executed. The program execution management device 33 receives the message 364 from the controller 313 via the connection line 3312, and transmits the message 364 to the cloud management platform 10 via the network communication component 333. The manager of the cloud management platform 10 can know that the flash memories 311 of the electronic apparatus 30 has been destroyed after the cloud management platform 10 receives the message 364 indicating the completion of physical destruction. Accordingly, when an abnormality event occurs, for example, the electronic apparatus 30 is stolen by others, the manager of the cloud management platform 10 can remotely destroy the flash memories 311 of the data storage device 31 to prevent the confidential data stored in the flash memory 311 to be stolen by others.

Figure 7:
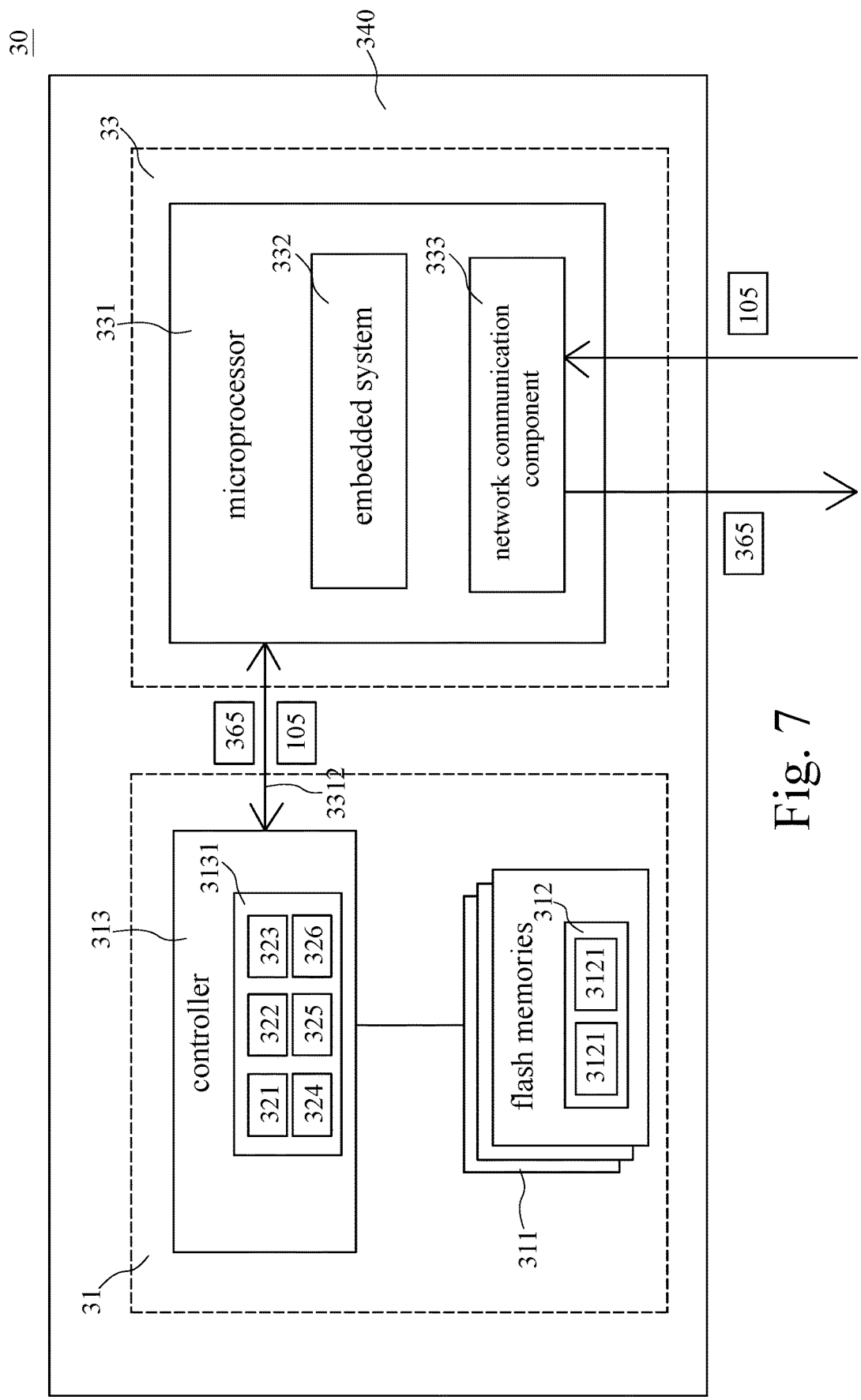
FIG. 7 is a circuit diagram of the electronic apparatus according to another application embodiment of the present invention.

Referring to FIG. 7, there is a circuit diagram of the electronic apparatus according to another application embodiment of the present invention, and referring to FIG. 1, simultaneously. In this present embodiment, the flash memories 311 of the data storage device 31 is formed with a data sector 312, at least one partition 3121 is cut out from the data sector 312 by the controller 313, the manager of the cloud management platform 10 can execute an operation for write protection to the partition 3121 of the flash memories 311, as shown in FIG. 1 and FIG. 7. When the manager of the cloud management platform 10 wants that the electronic apparatus 30 executes the operation of write protection to the partition 3121 of the flash memories 311, he sends a write protection setting instruction 105 to the electronic apparatus 30 via the management interface 11. After the electronic apparatus 30 receives the write protection setting instruction 105 sent from the cloud management platform 10 via the network communication component 333, the microprocessor 331 of the program execution management device 33 will transmit the write protection setting instruction 105 to the controller 313 via the connection line 3312, and then the controller 313 of the data storage device 31 will execute a write protection setting program 325 according to the requirement of the write protection setting instruction 105. During the execution of the write protection setting program 325, the controller 313 sets the partition 3121 of the flash memories 311 to be a read-only area for prohibiting to be written. The controller 313 will generate a message 365 indicating the completion of setting write protection after the write protection setting program 325 has executed. The program execution management device 33 receives the message 365 from the controller 313 via the connection line 3312, and transmits the message 365 to the cloud management platform 10 via the network communication component 333. The manager of the cloud management platform 10 can know that the write protection of the flash memories 311 of the electronic apparatus 30 has been set after the cloud management platform 10 receives the message 365 indicating the completion of setting write protection. Accordingly, the manager of the cloud management platform 10 can remotely set the partition 3121 of the flash memories 311 to be a read-only area for prohibiting the writing of data, so that the specific data stored in the partition 3121 will avoid to be overwritten by other data and therefore lost.

Figure 8:
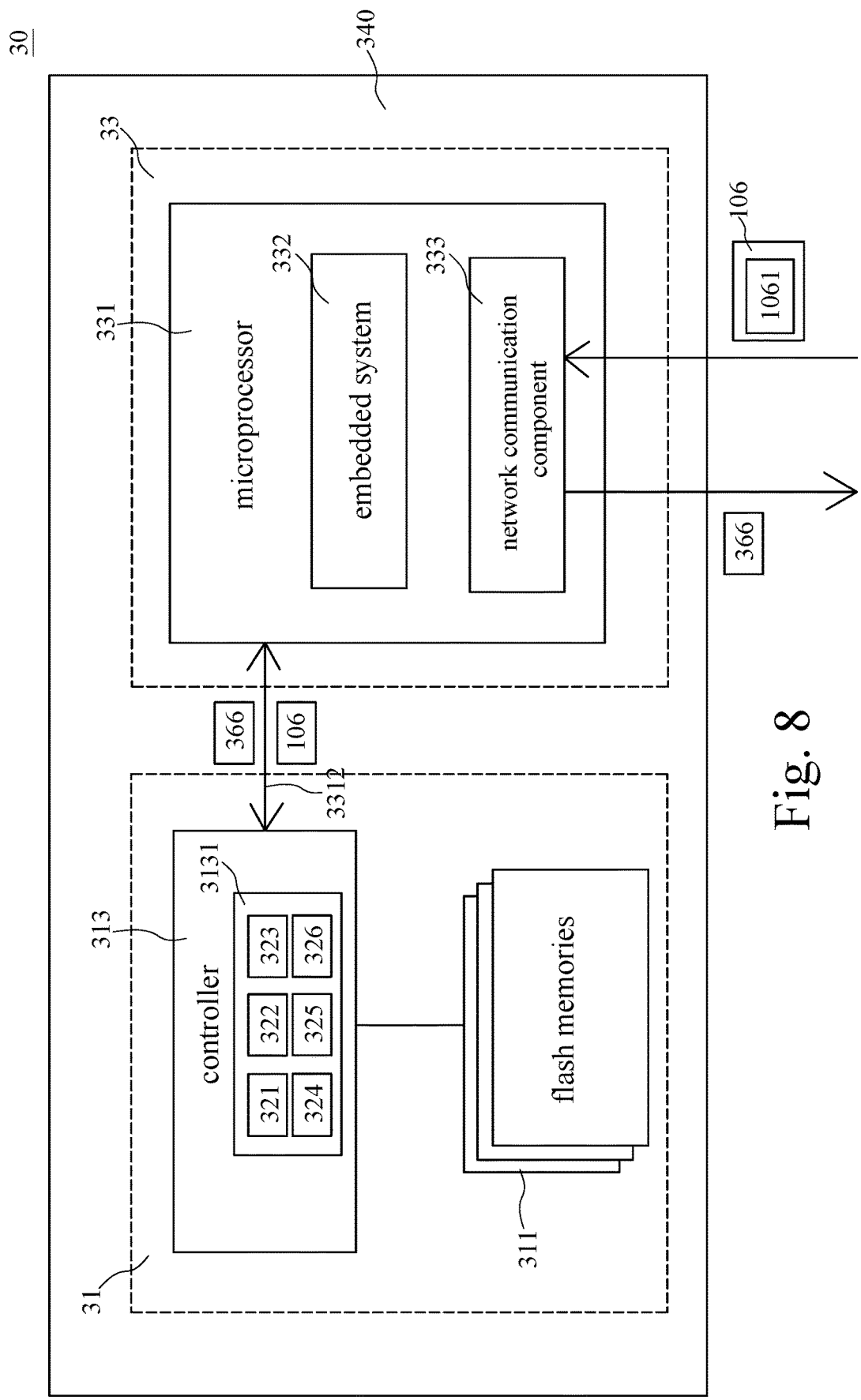
FIG. 8 is a circuit diagram of the electronic apparatus according to another application embodiment of the present invention.

Referring to FIG. 8, there is a circuit diagram of the electronic apparatus according to another application embodiment of the present invention, and referring to FIG. 1, simultaneously. In this present embodiment, the manager of the cloud management platform 10 can execute an operation of updating the firmware of the electronic apparatus 30, as shown in FIG. 1 and FIG. 8. When the manager of the cloud management platform 10 wants that the electronic apparatus 30 executes the operation of updating firmware, he sends an updating firmware instruction 106 to the electronic apparatus 30 via the management interface 11. The operation instruction 106 includes a firmware updating file 1061. After the electronic apparatus 30 receives the updating firmware instruction 106 sent from the cloud management platform 10 via the network communication component 333, the microprocessor 331 of the program execution management device 33 will transmit the updating firmware instruction 106 to the controller 313 via the connection line 3312, and then the controller 313 of the data storage device 31 will execute an updating firmware program 326 according to the requirement of the updating firmware instruction 106. During the execution of the updating firmware program 326, the controller 313 updates the firmware 3131 by the firmware updating file 1061 in the updating firmware instruction 106. The controller 313 will generate a message 366 indicating the completion of updating firmware after the updating firmware program 326 has executed. The program execution management device 33 receives the message 366 from the controller 313 via the connection line 3312, and transmits the message 366 to the cloud management platform 10 via the network communication component 333. The manager of the cloud management platform 10 can know that the firmware 3131 of the electronic apparatus 30 has been updated after the cloud management platform 10 receives the message 366 indicating the completion of updating firmware. Accordingly, the manager of the cloud management platform 10 is able to remotely update the programs defined in the firmware 3131 of the electronic apparatus 30 at any time, so that the manager of the cloud management platform 10 can remotely control that the electronic apparatus 30 executes the operations of a variety of program.

The six embodiments in the above described are only partially implementation of the present invention. In actual application, the programs of other applications may be further defined or set in the firmware 3131 of the electronic apparatus 30, so that the manager of the cloud management platform 10 in the remote end can control that the electronic apparatus 30 executes the operations of a variety of program.

As the above described, the manager of the cloud management platform 10 can remotely manage the programs executed by the controller 313 of the data storage device 31 via the program execution management device 33. During the program execution management device 33 managing the programs executed by the controller 313, the microprocessor 331 of the program execution management device 33 can directly communicate with the controller 313 of the data storage device 31 via a dedicated connection line 3312 without the assistance of the operating system and the data transmission channel. Even if the operating system of the data storage device 31 fails or the data storage device 31 does not has the operating system, the manager of the cloud management platform 10 at the remote end, via the program execution management device 33, can still control that the controller 313 of the data storage device 31 executes the operation of the specific program.

Figure 9:
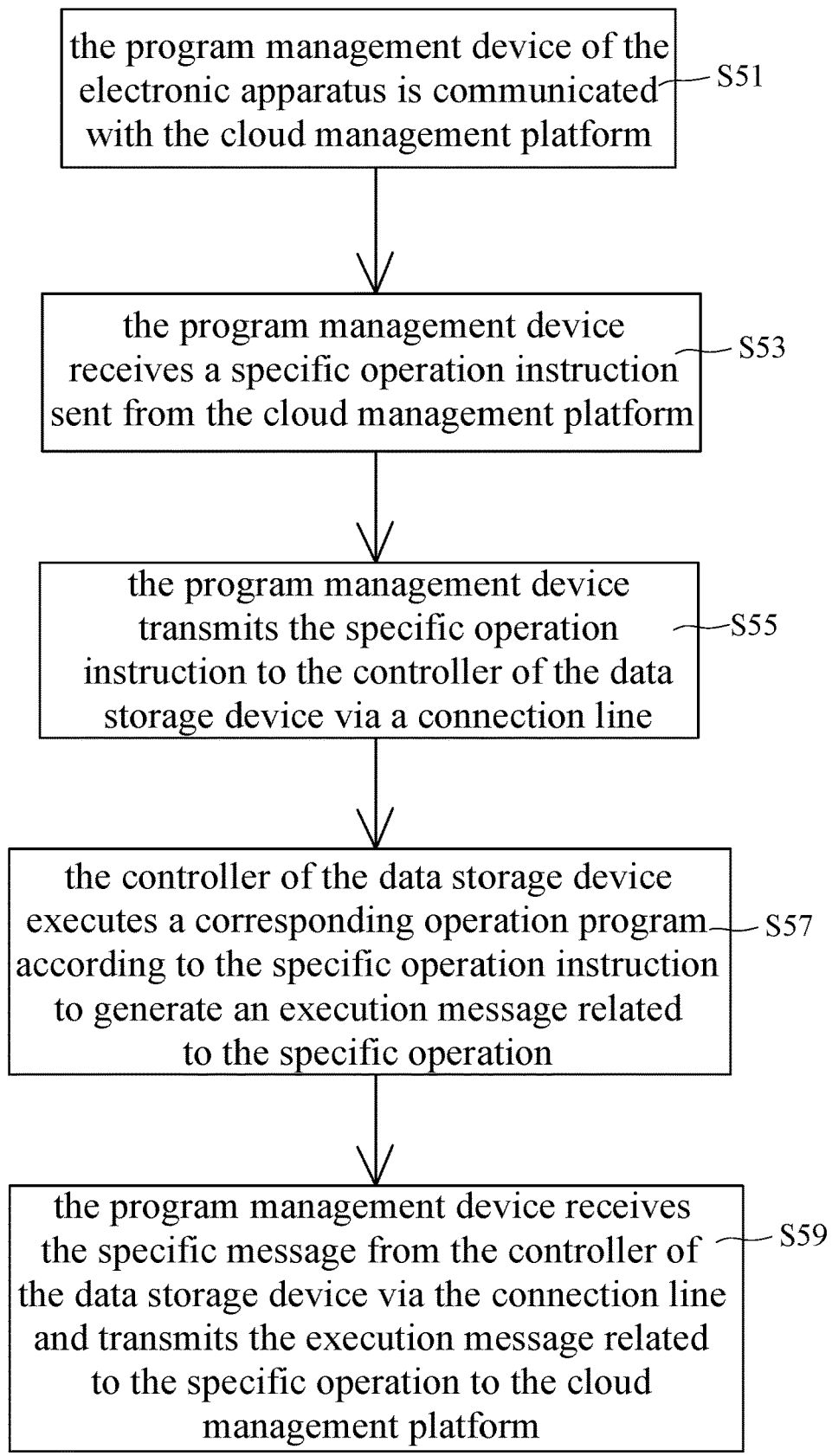
FIG. 9 is a flowchart of a method capable of remotely controlling the electronic apparatus to execute program according to the present invention.

Referring to FIG. 9, there is shown a flowchart of a method capable of remotely controlling the electronic apparatus to execute program according to the present invention. As shown in FIG. 9, firstly, in Step S51, the program execution management device 33 of the electronic apparatus 30 is communicated with the cloud management platform 10 via the network communication component 333. In Step S53, the program execution management device 33 receives a specific operation instruction 101, 102, 103, 104, 105, or 106 sent from the cloud management platform 10. In Step S55, the program execution management device 33 transmits the specific operation instruction 101, 102, 103, 104, 105, or 106 to the controller 313 of the data storage device 31 via the connection line 3312. In Step S57, the controller 313 executes a corresponding operation program 321, 322, 323, 324, 325, or 326 according to the specific operation instruction 101, 102, 103, 104, 105, or 106 so as to generate at least one execution message related to the specific operation. In Step S59, the program execution management device 33 receives the execution message related to the specific operation from the controller 313 of the data storage device 31 via the connection line 3312, and transmits the execution message related to the specific operation to the cloud management platform 10 via the network communication component 333. The manager of the cloud management platform 10 can know that the specific operation program 321, 322, 323, 324, 325, or 326 has been executed by the electronic apparatus 30 after the cloud management platform 10 receives the execution message related to the specific operation.

In one application embodiment of the present invention, the specific operation instruction sent from the cloud management platform 10 is an instruction 101 for collecting the health information of the data storage device 31. After Steps S51, S53, and S55 has executed, the controller 313 will receive the instruction 101. Then, in Steps S57, the controller 313 executes a program 321 for collecting the health information of the data storage device 31 according to the instruction 101, and generates a file 361 containing the health information of the data storage device 31 after the program 321 for collecting the health information of the data storage device 31 has executed. Finally, in the Step S59, the program execution management device 33 receives the file 361 containing the health information of the data storage device 31 from the controller 313, and transmits the file 361 containing the health information of the data storage device 31 to the cloud management platform 10.

In another application embodiment of the present invention, the specific operation instruction sent from the cloud management platform 10 is a data encryption instruction 102. After Steps S51, S53, and S55 has executed, the controller 313 will receive the data encryption instruction 102. Then, in Steps S57, the controller 313 executes a data encryption program 322 according to the data encryption instruction 102 to encrypt data stored in the flash memory 311 by the encryption key 1021 of the data encryption instruction 102, and generates a message 362 indicating the completion of encryption of data after the data encryption program 322 has executed. Finally, in the Step S59, the program execution management device 33 receives the message 362 indicating the completion of encryption of data from the controller 313, and transmits the message 362 indicating the completion of encryption of data to the cloud management platform 10.

In another application embodiment of the present invention, the specific operation instruction sent from the cloud management platform 10 is a data erasion instruction 103. After Steps S51, S53, and S55 has executed, the controller 313 will receive the data erasion instruction 103. Then, in Steps S57, the controller 313 executes a data erasion program 323 according to the data erasion instruction 103 to erase data stored in the block 3110 of the flash memories 311, and generates a message 363 indicating the completion of erasion of data after the data erasion program 323 has executed. Finally, in the Step S59, the program execution management device 33 receives the message 363 indicating the completion of erasion of data from the controller 313, and transmits the message 363 indicating the completion of erasion of data to the cloud management platform 10.

In another application embodiment of the present invention, the specific operation instruction sent from the cloud management platform 10 is a physical destruction instruction 104. After Steps S51, S53, and S55 has executed, the controller 313 will receive the physical destruction instruction 104. Then, in Steps S57, the controller 313 executes a physical destruction program 324 according to the physical destruction instruction 104 to destroy the memory cells of the flash memories 311 by a high voltage, and generates a message 364 indicating the completion of physical destruction after the physical destruction program 324 has executed. Finally, in the Step S59, the program execution management device 33 receives the message 364 indicating the completion of physical destruction, and transmits the message 364 indicating the completion of destruction of physical element to the cloud management platform 10.

In another application embodiment of the present invention, the specific operation instruction sent from the cloud management platform 10 is a write protection setting instruction 105. After Steps S51, S53, and S55 has executed, the controller 313 will receive the write protection setting instruction 105. Then, in Steps S57, the controller 313 executes a write protection setting program 325 according to the write protection setting instruction 105 to set the partition 3121 of the flash memories 311 to be a read-only area, and then generates a message 365 indicating the completion of setting write protection after the write protection setting program 325 has executed. Finally, in the Step S59, the program execution management device 33 receives the message 365 indicating the completion of setting write protection, and transmits the message 365 indicating the completion of setting write protection to the cloud management platform 10.

In another application embodiment of the present invention, the specific operation instruction sent from the cloud management platform 10 is an updating firmware instruction 106. After Steps S51, S53, and S55 has executed, the controller 313 will receives the updating firmware instruction 106. Then, in Steps S57, the controller 313 executes an updating firmware program 326 according to the updating firmware instruction 106 to update the firmware 3131 by the firmware updating file 1061 in the updating firmware instruction 106, and then generates a message 366 indicating the completion of updating firmware after the operation program 326 has executed. Finally, in the Step S59, the program execution management device 33 receives the message 366 indicating the completion of updating firmware, and transmits the message 366 indicating the completion of updating firmware to the cloud management platform 10.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A system capable of remotely controlling electronic apparatus to execute program, comprising:
a cloud management platform, comprising a management interface; and
at least one electronic apparatus, each of the electronic apparatuses comprising:
a data storage device comprising a plurality of flash memories and a controller connected to the flash memories, the controller comprising a firmware, wherein, a plurality of operation programs are defined in the firmware; and
a program execution management device comprising a microprocessor and a network communication component connected to the microprocessor, wherein the program execution management device is communicated with the cloud management platform via the network communication component, a networkable component and the microprocessor of the program execution management device is connected to the controller of the data storage device via a connection line, the microprocessor of the program execution management device is equipped with an embedded system for managing the operation programs executed by the controller;
wherein the electronic apparatus further comprises a circuit board, the flash memories and the controller of the data storage device and the microprocessor and the network communication component of the program execution management device are disposed on the circuit board so that the program execution management device can be integrated in the data storage device, and therefore the data storage device is formed as a data storage device with a program execution management function;
wherein the cloud management platform sends a specific operation instruction to the program execution management device when the cloud management platform wants that the electronic apparatus executes a specific operation, the microprocessor of the program execution management device transmits the specific operation instruction to the controller of the data storage device; afterwards, the controller executes the corresponding operation program according to the specific operation instruction to generate an execution message related to the specific operation, and transmits the execution message related to the specific operation to the cloud management platform.

2. The system according to claim 1, wherein the specific operation instruction sent from the cloud management platform is an instruction for collecting health information of the data storage device, the controller executes a program for collecting health information of the data storage device according to the instruction for collecting health information of the data storage device, and generates a file containing the health information of the data storage device; afterwards, the program execution management device receives the file containing the health information of the data storage device from the controller via the connection line, and transmits the file containing the health information of the data storage device to the cloud management platform via the network communication component.

3. The system according to claim 1, wherein the specific operation instruction sent from the cloud management platform is a data encryption instruction, the data encryption instruction includes an encryption key, the controller executes a data encryption program according to the data encryption instruction to encrypt data in the flash memories by the encryption key in the data encryption instruction, and generates a message indicating the completion of encryption of data after the data encryption program has executed; afterwards, the program execution management device receives the message indicating the completion of encryption of data from the controller via the connection line, and transmits the message indicating the completion of encryption of data to the cloud management platform via the network communication component.

4. The system according to claim 1, wherein the data storage device further comprises an encryption chip connected to the controller and the flash memories, the specific operation instruction sent from the cloud management platform is a data encryption instruction, the controller executes a data encryption program according to the data encryption instruction to encrypt data in the flash memories by the encryption chip, and generates a message indicating the completion of encryption of data after the data encryption program has executed; afterwards, the program execution management device receives the message indicating the completion of encryption of data from the controller via the connection line, and transmits the message indicating the completion of encryption of data to the cloud management platform via the network communication component.

5. The system according to claim 1, wherein the specific operation instruction sent from the cloud management platform is a data erasion instruction, the controller executes a data erasion program according to the data erasion instruction to erase data in blocks of the flash memories, and generates a message indicating the completion of erasion of data after the data erasion program has executed; afterwards, the program execution management device receives the message indicating the completion of erasion of data from the controller via the connection line, and transmits the message indicating the completion of erasion of data to the cloud management platform via the network communication component.

6. The system according to claim 1, wherein the specific operation instruction sent from the cloud management platform is a physical destruction instruction, the controller executes a physical destruction program according to the physical destruction instruction to destroy the flash memories by a high voltage that is outputted from a high voltage circuit enabled by the controller, and generates a message indicating the completion of physical destruction after the physical destruction program has executed; afterwards, the program execution management device receives the message indicating the completion of physical destruction from the controller via the connection line, and transmits the message indicating the completion of physical destruction to the cloud management platform via the network communication component.

7. The system according to claim 1, wherein the flash memories of the data storage device is formed with a data sector, at least one partition is cut out from the data sector by the controller, the specific operation instruction sent from the cloud management platform is a write protection setting instruction, the controller executes a write protection setting program according to the write protection setting instruction to set the partition of the flash memories to be a read-only area for prohibiting to be written, and generates a message indicating the completion of setting write protection after the write protection setting program has executed; afterwards, the program execution management device receives the message indicating the completion of setting write protection from the controller via the connection line, and transmits the message indicating the completion of setting write protection to the cloud management platform via the network communication component.

8. The system according to claim 1, wherein the specific operation instruction sent from the cloud management platform is an updating firmware instruction, the updating firmware instruction includes a firmware updating file, the controller executes an updating firmware program according to the updating firmware instruction to update the firmware of the controller by the firmware updating file in the updating firmware instruction, and generates a message indicating the completion of updating firmware after the updating firmware program has executed; afterwards, the program execution management device receives the message indicating the completion of updating firmware from the controller via the connection line, and transmits the message indicating the completion of updating firmware to the cloud management platform via the network communication component.

9. The system according to claim 1, wherein the microprocessor of the program execution management device is a chip with network communication function, the network communication component is integrated in the microprocessor.

10. The system according to claim 1, wherein the microprocessor of the program execution management device is connected to the controller of the data storage device via the connection line conforming to RS232 specification, UART specification, or I2C specification.

11. The system according to claim 1, wherein the data storage device is a data storage device having a SATA transmission interface, a PCIe transmission interface or an M.2 transmission interface.

12. The system according to claim 1, wherein the network communication component is a WiFi communication component, an Ethernet communication component, or a 3G, 4G or 5G communication component.

13. A method capable of remotely controlling electronic apparatus to execute program, which is applied to a system capable of remotely controlling electronic apparatus to execute program, the system comprises a cloud management platform and at least one electronic apparatus, the electronic apparatus comprises a data storage device and a program execution management device, the data storage device comprises a plurality of flash memories and a controller, the controller comprises a firmware, a plurality of operation programs are defines in the firmware, the program execution management device comprises a microprocessor that is having a network communication function and equipped with an embedded system for managing the operation programs executed by the controller, the microprocessor of the program execution management device is connected to the controller of the data storage device via a connection line, wherein the electronic apparatus further comprises a circuit board, the flash memories and the controller of the data storage device and the microprocessor and the network communication component of the program execution management device are disposed on the circuit board so that the program execution management device can be integrated in the data storage device, and therefore the data storage device is formed as a data storage device with a program execution management function, the method comprising:

requiring the program execution management device to communicate with the cloud management platform;

requiring the program execution management device to receive a specific operation instruction sent from the cloud management platform;

requiring the program execution management device to transmit the specific operation instruction to the controller of the data storage device;

requiring the controller of the data storage device to execute a specific operation of the corresponding operation program according to the specific operation instruction and generate an execution message related to the specific operation; and requiring the program execution management device to receive the execution message related to the specific operation from the controller of the data storage device via the connection line and transmit the execution message related to the specific operation to the cloud management platform.

14. The method according to claim 13, wherein the specific operation instruction sent from the cloud management platform is an instruction for collecting health information of the data storage device, the steps of the method capable of remotely controlling electronic apparatus to execute program comprising:

requiring the controller to execute a program for collecting health information of the data storage device according to the instruction for collecting health information of the data storage device and generate a file containing the health information of the data storage device; and requiring the program execution management device to receive the file containing the health information of the data storage device from the controller of the data storage device via the connection line and transmit the file containing the health information of the data storage device to the cloud management platform.

15. The method according to claim 13, wherein the specific operation instruction sent from the cloud management platform is a data encryption instruction, the data encryption instruction includes an encryption key, the steps of the method capable of remotely controlling electronic apparatus to execute program comprising:

requiring the controller to execute a data encryption program according to the data encryption instruction to encrypt data in the flash memories by the encryption key in the data encryption instruction;

requiring the controller to generate a message indicating the completion of encryption of data after the data encryption program has executed; and requiring the program execution management device to receive the message indicating the completion of encryption of data from the controller of the data storage device via the connection line and transmit the message indicating the completion of encryption of data to the cloud management platform.

16. The method according to claim 13, wherein the specific operation instruction sent from the cloud management platform is a data encryption instruction, the data storage device further comprises an encryption chip, the steps of the method capable of remotely controlling electronic apparatus to execute program comprising:

requiring the controller to execute a data encryption program according to the data encryption instruction to encrypt data in the flash memories by the encryption chip;

requiring the controller to generate a message indicating the completion of encryption of data after the data encryption program has executed; and requiring the program execution management device to receive the message indicating the completion of encryption of data from the controller of the data storage device via the connection line and transmit the message indicating the completion of encryption of data to the cloud management platform.

17. The method according to claim 13, wherein the specific operation instruction sent from the cloud management platform is a data erasion instruction, the steps of the method capable of remotely controlling electronic apparatus to execute program comprising:

requiring the controller to execute a data erasion program according to the data erasion instruction to erase data in blocks of the flash memories;

requiring the controller to generate a message indicating the completion of erasion of data after the data erasion program has executed; and requiring the program execution management device to receive the message indicating the completion of erasion of data from the controller of the data storage device via the connection line and transmit the message indicating the completion of erasion of data to the cloud management platform.

18. The method according to claim 13, wherein the specific operation instruction sent from the cloud management platform is a physical destruction instruction, the steps of the method capable of remotely controlling electronic apparatus to execute program comprising:

requiring the controller to execute a physical destruction program according to the physical destruction instruction to destroy the flash memories by a high voltage;

requiring the controller to generate a message indicating the completion of physical destruction after the physical destruction program has executed; and requiring the program execution management device to receive the message indicating the completion of physical destruction from the controller of the data storage device via the connection line and transmit the message indicating the completion of physical destruction to the cloud management platform.

19. The method according to claim 13, wherein the flash memories of the data storage device is formed with a data sector, at least one partition is cut out from the data sector by the controller, the specific operation instruction sent from the cloud management platform is a write protection setting instruction, the steps of the method capable of remotely controlling electronic apparatus to execute program comprising:

requiring the controller to execute a write protection setting program according to the write protection setting instruction to set the partition of the flash memories to be a read-only area for prohibiting to be written;

requiring the controller to generate a message indicating the completion of setting write protection after the write protection setting program has executed; and requiring the program execution management device to receive the message indicating the completion of setting write protection from the controller of the data storage device via the connection line and transmit the message indicating the completion of setting write protection to the cloud management platform.

20. The method according to claim 13, where the specific operation instruction sent from the cloud management platform is an updating firmware instruction, the updating firmware instruction includes a firmware updating file, the steps of the method capable of remotely controlling electronic apparatus to execute program comprising:

requiring the controller to execute an updating firmware program according to the updating firmware instruction to update the firmware of the controller by the firmware updating file in the updating firmware instruction;

requiring the controller to generate a message indicating the completion of updating firmware after the updating firmware program has executed; and requiring the program execution management device to receive the message indicating the completion of updating firmware from the controller of the data storage device via the connection line and transmit the message indicating the completion of updating firmware to the cloud management platform.

\* \* \* \* \*